US012586746B2

(12) United States Patent
Wyatt et al.

(10) Patent No.: US 12,586,746 B2
(45) Date of Patent: Mar. 24, 2026

(54) CIRCUIT BREAKER TRIP MECHANISM ASSEMBLY

(71) Applicant: SAFRAN POWER USA, LLC, Twinsburg, OH (US)

(72) Inventors: Christopher Wyatt, Twinsburg, OH (US); Dean Morgan, Twinsburg, OH (US)

(73) Assignee: SAFRAN POWER USA, LLC, Twinsburg, OH (US)

( * ) Notice: Subject to any disclaimer, the term of this patent is extended or adjusted under 35 U.S.C. 154(b) by 370 days.

(21) Appl. No.: 18/250,011

(22) PCT Filed: Oct. 26, 2020

(86) PCT No.: PCT/US2020/057285
§ 371 (c)(1),
(2) Date: Apr. 21, 2023

(87) PCT Pub. No.: WO2022/093163
PCT Pub. Date: May 5, 2022

(65) Prior Publication Data

US 2023/0368998 A1 Nov. 16, 2023

(51) Int. Cl.
*H01H 71/10* (2006.01)
*H01H 71/16* (2006.01)
*H01H 71/58* (2006.01)

(52) U.S. Cl.
CPC ........ *H01H 71/1027* (2013.01); *H01H 71/16* (2013.01); *H01H 71/58* (2013.01)

(58) Field of Classification Search
CPC .. H01H 71/1027; H01H 71/16; H01H 71/162; H01H 71/58; H01H 73/045; H01H 73/30; H01H 9/0072

(Continued)

(56) References Cited

U.S. PATENT DOCUMENTS 4,110,719 A 8/1978 Kirkup
7,064,636 B1 * 6/2006 Walz ...................... H01H 83/20
335/18

(Continued)

FOREIGN PATENT DOCUMENTS

GB 1349593 A 4/1974

OTHER PUBLICATIONS

International Search Report, International Application No. PCT/US2020/057285, dated Jul. 22, 2021, 2 pages.

(Continued)

*Primary Examiner* — William A Bolton
(74) *Attorney, Agent, or Firm* — Kilpatrick Townsend & Stockton LLP

(57) ABSTRACT

A circuit breaker includes a housing, a first trip mechanism, and a second trip mechanism. The first trip mechanism includes a first plunger selectively spring biased to a first plunger extended position from a first plunger retracted position. The second trip mechanism includes a second pin supported on the first plunger and configured to be driven by the first plunger to a second pin extended position that follows the first plunger extended position. A second lever fixed with respect to the second pin is configured to be driven by the second pin to a second lever extended position. A second plunger is selectively spring biased to a second plunger extended position, and when the second pin is driven to the second pin extended position, the second lever follows the second pin to the second lever extended position to allow the second plunger to be in the second plunger extended position.

20 Claims, 5 Drawing Sheets

(58) Field of Classification Search
USPC ......... 200/293, 400, 50.36, 50.16, 412, 510, 200/520, 522, 277.1, 314, 341; 337/46, 337/43
See application file for complete search history.

(56) References Cited

U.S. PATENT DOCUMENTS

| | | | | |
|---|---|---|---|---|
| 7,570,146 | B2 * | 8/2009 | Mills | H01H 71/04 337/79 |
| 8,836,453 | B2 * | 9/2014 | Yang | H01H 9/20 335/167 |
| 10,395,874 | B2 * | 8/2019 | Wyatt | H01H 50/541 |
| 2020/0219691 | A1 * | 7/2020 | Inaguchi | H01H 71/2472 |

OTHER PUBLICATIONS

International Application No. PCT/US2020/057285, International Preliminary Report on Patentability mailed on May 11, 2023, 9 pages.

* cited by examiner

CIRCUIT BREAKER TRIP MECHANISM ASSEMBLY

BACKGROUND

Three-phase electric power and similar polyphase systems present a common method of alternating current electric power generation, transmission, and distribution. Circuit breakers are often employed as automatically operated electrical switches configured to protect an electrical circuit from damage in excess current caused by, for example, an overload or a short circuit. However, there is a continued objective in circuit breaker design for providing a reliable, resettable, user friendly, and compact circuit breaker configured for accommodating a polyphase current load such that the circuit breaker trips each circuit supporting each phase in the polyphase current load in the event any single phase introduces excessive current to the circuit breaker.

SUMMARY

According to one aspect, a circuit breaker includes a housing, a first trip mechanism, and a second trip mechanism. The first trip mechanism is disposed in the housing, the first trip mechanism including a first plunger disposed within the housing and selectively spring biased to a first plunger extended position from a first plunger retracted position. The second trip mechanism is disposed in the housing, the second trip mechanism including a second pin, a second lever, a second plunger, a third set of electrical contacts, and a fourth set of electrical contacts. The second pin is supported on the first plunger and is configured to be driven by the first plunger to a second pin extended position that follows the first plunger extended position, and to a second pin retracted position that follows the first plunger retracted position. The second lever is pivotally fixed with respect to the second pin and is configured to be driven by the second pin to a second lever extended position that follows the second pin extended position, and to a second lever retracted position that follows the second pin retracted position. The second plunger is disposed within the housing and selectively spring biased to a second plunger extended position. The third set of electrical contacts is fixed with respect to the second plunger, and the fourth set of electrical contacts is fixed with respect to the housing. The second plunger defines a second plunger retracted position in which the third set of electrical contacts directly contact the fourth set of electrical contacts so as to make electrical contact, and the second plunger defines the second plunger extended position in which the third set of electrical contacts and the fourth set of electrical contacts are spaced from one another so as to create an open circuit. When the second pin is driven to the second pin extended position by the first plunger, the second lever follows the second pin to the second lever extended position to allow the second plunger to be in the second plunger extended position, thereby causing the third set of electrical contacts to be spaced from the fourth set of electrical contacts.

According to another aspect, a circuit breaker includes a housing, a first trip mechanism, and a second trip mechanism. The first trip mechanism is disposed in the housing, the first trip mechanism including a first plunger disposed within the housing and selectively spring biased to a first plunger extended position from a first plunger retracted position, a first pin fixed with respect to the housing, and a first lever pivotally fixed with respect to the first pin. The first lever defines a first lever engaged position in which the first lever abuts the first plunger and retains the first plunger in the first plunger retracted position, and the first lever defines a first lever disengaged position in which the first lever allows the first plunger to be in the first plunger extended position. The second trip mechanism is disposed in the housing, the second trip mechanism including a second plunger and a trip arm. The second plunger is disposed within the housing and is selectively spring biased to a second plunger extended position from a second plunger retracted position. The trip arm is extended from the second plunger such that the trip arm is spaced from the first trip mechanism when the second plunger is in the second plunger retracted position, and such that the trip arm drives the first lever into the first lever disengaged position when the second plunger is driven toward the second plunger extended position.

DETAILED DESCRIPTION

Figure 1:
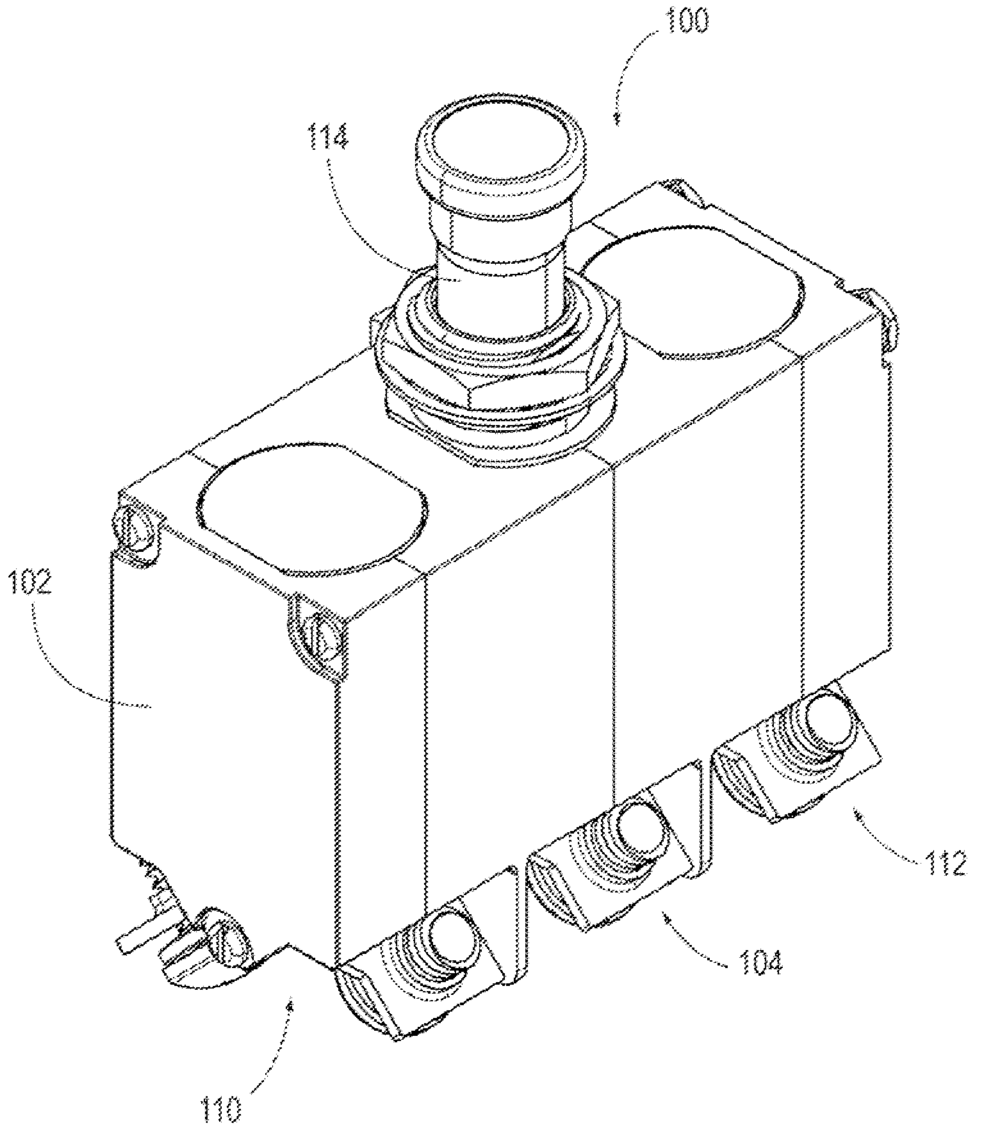
FIG. 1 is a perspective view of a circuit breaker.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a circuit breaker 100 including a housing 102, a first set of line ends 104 disposed on the housing and configured for facilitating a first phase electric current flowing through the circuit breaker 100, a second set of line ends 110 disposed on the housing 102 and configured for facilitating a second phase electric current flowing through the flowing through the circuit breaker 100, a third set of line ends 112 disposed on the housing 102 and configured for facilitating a third phase electric current flowing through the circuit breaker 100, and a switch 114 mounted on the housing 102 and extending into the housing 102.

The switch 114 is configured for being actuated by a user from a switch extended position to a switch retracted position with respect to the housing 102. In the depicted embodiment, the switch 114 is a button configured for being actuated by being pressed by a user from the switch extended position to the switch retracted position, however, alternative types of switch mechanisms may be employed as the switch 114 without departing from the scope of the present disclosure.

Figure 2:
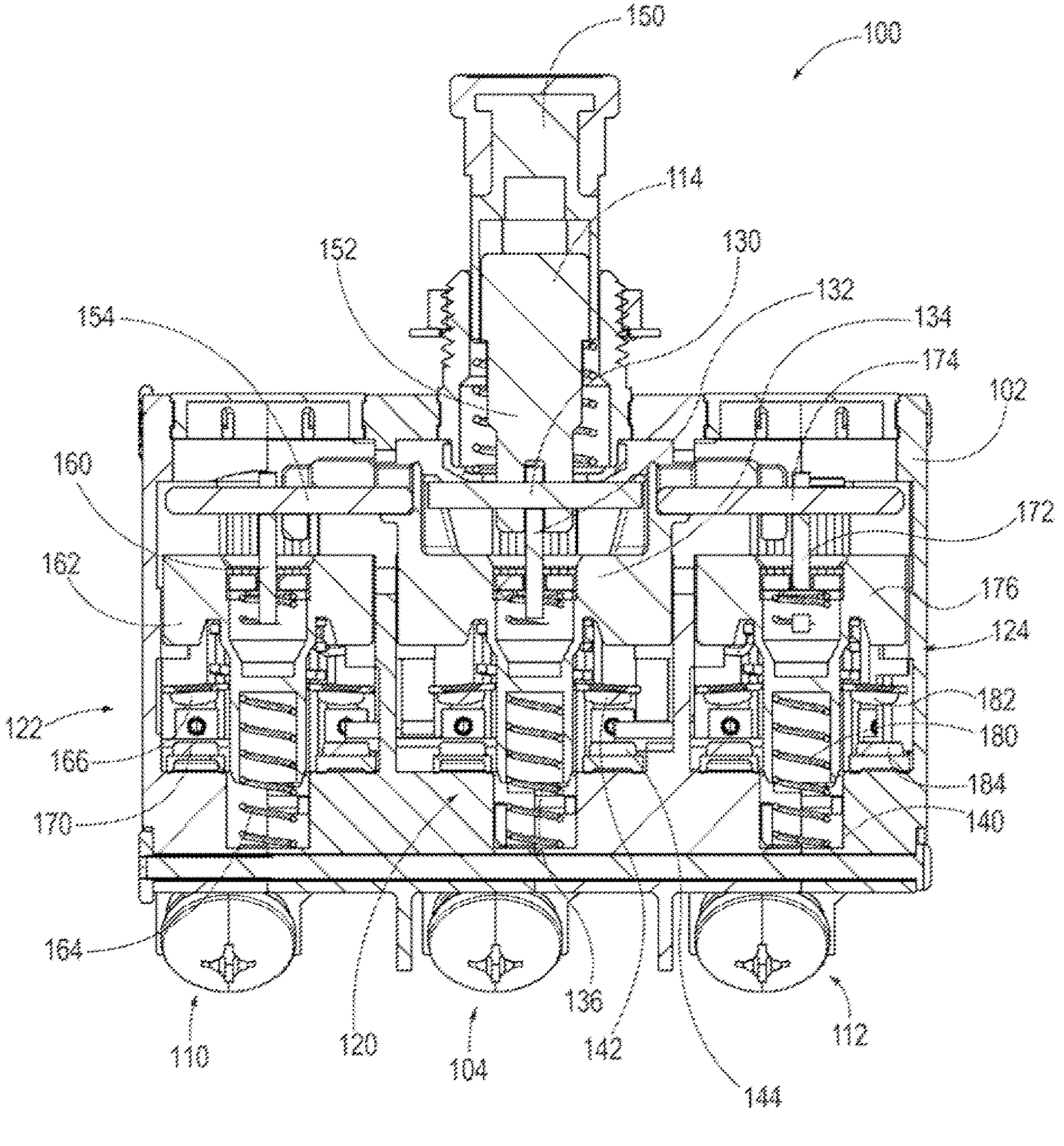
FIG. 2 is a cross-sectional front view of the circuit breaker.

FIG. 2 depicts a cross-sectional front view of the circuit breaker 100. As shown, the circuit breaker 100 includes a first trip mechanism 120 electrically connected to the first set of line ends 104, a second trip mechanism 122 electrically connected to the second set of line ends 110, and a third trip mechanism 124 electrically connected to the third set of line ends 112, where each of the first trip mechanism 120, the second trip mechanism 122, and the third trip mechanism 124 are enclosed in the housing 102. The first trip mechanism includes a first pin 130 mounted on the switch 114 and fixed with respect to the housing 102 when the switch 114 is not being actuated. The first pin 130 is inserted through a first lever 132 such that the first lever 132 pivotally fixed with respect to the first pin 130. A first plunger 134 is disposed within the housing 102 and spring mounted on an inner surface 140 of the housing 102 with a first plunger spring 136 to be selectively spring biased to a first plunger extended position.

A first set of electrical contacts 142 extends from the first plunger 134 to be fixed with the first plunger 134, and a second set of electrical contacts 144 is mounted on the inner surface 140 of the housing 102 to be fixed with respect to the housing 102. The first plunger 134 defines a first plunger retracted position in which the first set of electrical contacts 142 directly contact the second set of electrical contacts 144 so as to make electrical contact and create a circuit that facilities the first phase electric current flowing through the circuit breaker 100 at the first trip mechanism 120. The first plunger 134 also defines the first plunger extended position in which the first set of electrical contacts 142 and the second set of electrical contacts 144 are spaced from one another so as to create an open circuit.

The first lever 132 defines a first lever engaged position in which the first lever 132 abuts the first plunger 134 and retains the first plunger 134 in the first plunger retracted position. The first lever 132 also defines a first lever disengaged position in which the first lever 132 allows the first plunger 134 to be in the first plunger extended position. With the first pin 130 inserted through the first lever 132 such that the first lever 132 is pivotally fixed with respect to the first pin 130, the first lever 132 is configured to pivot about the first pin 130 between and including the first lever engaged position and the first lever disengaged position.

The switch 114 is mounted on the housing 102 with a switch external portion 150 located external to the housing 102 and configured for being pressed by a user to actuate the switch 114 from the switch extended position to the switch retracted position. The switch 114 also includes a switch internal portion 152 located internal to the housing 102 and fixed with the first pin 130 such that the switch 114 is configured to drive the first pin 130 from a first pin extended position to a first pin retracted position when the switch 114 is actuated from the switch extended position to the switch retracted position.

The first pin 130 defines the first pin extended position, which follows the switch extended position and corresponds with the first plunger extended position, and the first pin 130 defines the first pin retracted position, which follows the switch retracted position and corresponds with the first plunger retracted position, With this construction, actuating the switch 114 from the switch extended position toward the switch retracted position drives the first pin 130 from the first pin extended position toward the first pin retracted position, and through the first pin 130 drives the first plunger 134 from the first plunger extended position toward the first plunger retracted position.

The second trip mechanism 122 includes a second pin 154 supported on the first plunger 134 and configured to be driven by the first plunger 134 to a second pin extended position that follows the first plunger extended position, and to a second pin retracted position that follows the first plunger retracted position. The second pin 154 is inserted through a second lever 160 such that the second lever 160 is pivotally fixed with respect to the second pin 154 and configured to be driven by the second pin 154 to a second lever extended position that follows the second pin extended position, and to a second lever retracted position that follows the second pin retracted position. A second plunger 162 is disposed within the housing 102 and spring mounted on the inner surface 140 of the housing 102 with a second plunger spring 164 to be selectively spring biased to a second plunger extended position.

A third set of electrical contacts 166 extends from the second plunger 162 to be fixed with respect to the second plunger 162, and a fourth set of electrical contacts 170 is mounted on the inner surface 140 of the housing 102 to be fixed with respect to the housing 102. The second plunger 162 defines a second plunger retracted position in which the third set of electrical contacts 166 directly contact the fourth set of electrical contacts 170 so as to make electrical contact and create a circuit that facilities the second phase electric current flowing through the circuit breaker 100 at the second trip mechanism 122. The second plunger 162 defines the second plunger extended position in which the third set of electrical contacts 166 and the fourth set of electrical contacts 170 are spaced from one another so as to create an open circuit.

The second lever 160 defines a second lever engaged position in which the second lever 160 retains the second plunger 162 in the second plunger retracted position. The second lever 160 also defines a second lever disengaged position in which the second lever 160 permits the second plunger 162 to be in the second plunger extended position. When the second pin 154 is driven to the second pin extended position by the first plunger 134, the second lever 160 follows the second pin 154 to the second lever extended position to allow the second plunger 162 to be in the second plunger extended position, thereby causing the third set of electrical contacts 166 to be spaced from the fourth set of electrical contacts 170.

The third trip mechanism 124 includes a third pin 172 supported on the first plunger 134 and configured to be driven by the first plunger 134 to a third pin extended position that follows the first plunger extended position, and to a third pin retracted position that follows the first plunger retracted position. The third pin 172 is inserted through a third lever 174 such that the third lever 174 is pivotally fixed with respect to the third pin 172 and configured to be driven by the third pin 172 to a third lever extended position that follows the third pin extended position, and to a third lever retracted position that follows the third pin retracted position. A third plunger 176 is disposed within the housing 102 and spring mounted on the inner surface 140 of the housing 102 with a third plunger spring 180 to be selectively spring biased to a third plunger extended position.

A fifth set of electrical contacts 182 extends from the second plunger 162 to be fixed with the second plunger 162, and a sixth set of electrical contacts 184 fixed with the housing 102. The third plunger 176 defines a third plunger retracted position in which the fifth set of electrical contacts 182 directly contact the sixth set of electrical contacts 184 so as to make electrical contact, and create a circuit that facilities the third phase electric current flowing through the circuit breaker 100 at the third trip mechanism 124. The third plunger 176 defines the third plunger 176 extended position in which the fifth set of electrical contacts 182 and the sixth set of electrical contacts 184 are spaced from one another so as to create an open circuit.

The third lever 174 defines a third lever engaged position in which the third lever 174 retains the third plunger 176 in the third plunger retracted position. The third lever 174 also defines a third lever disengaged position in which the third lever 174 permits the third plunger 176 to be in the third plunger extended position. When the third pin 172 is driven to the third pin extended position by the first plunger 134, the third lever 174 follows the third pin 172 to the third lever extended position to allow the third plunger 176 to be in the third plunger extended position, thereby causing the fifth set of electrical contacts 182 to be spaced from the sixth set of electrical contacts 184.

Figure 3:
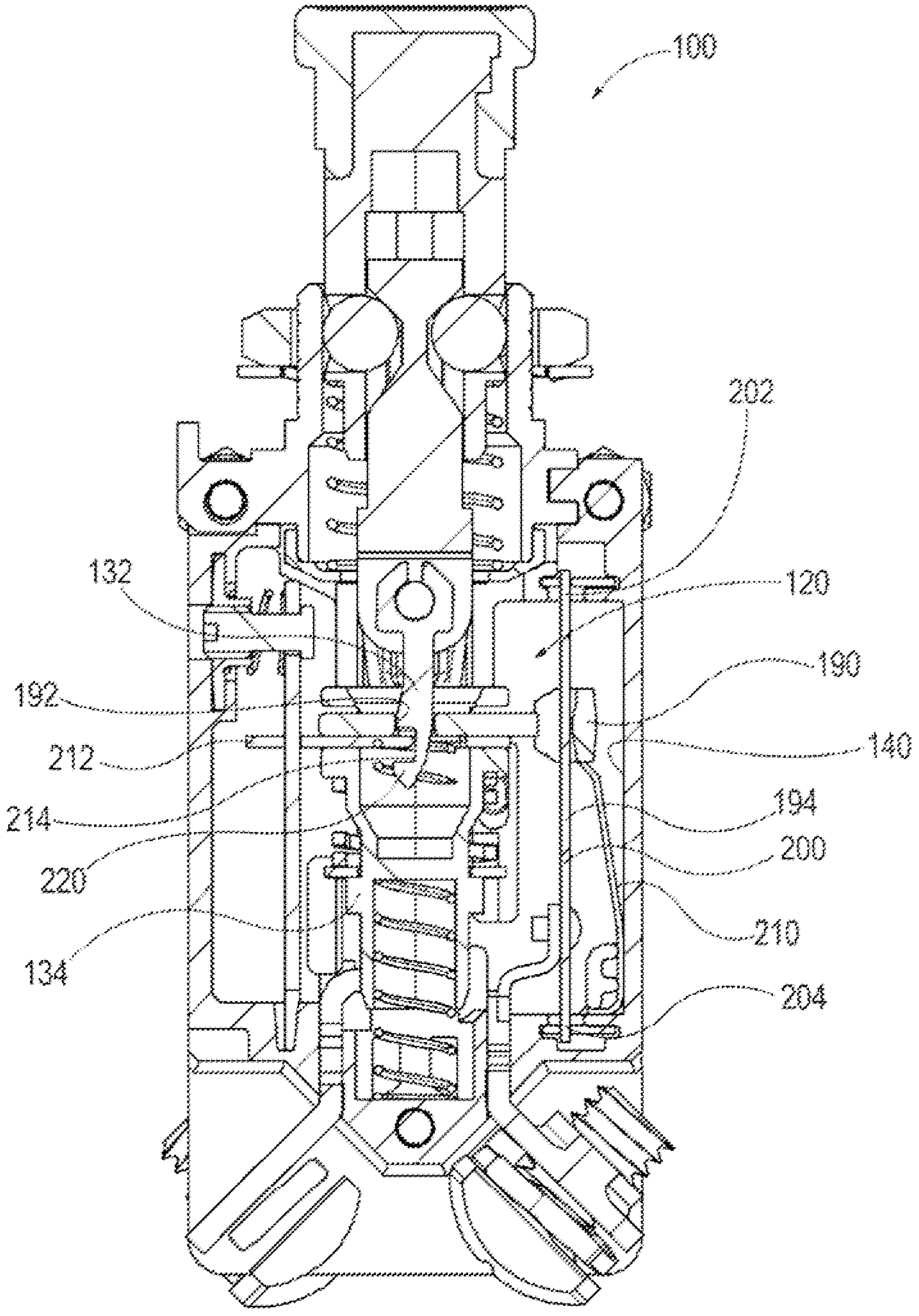
FIG. 3 is a cross-sectional side view of the circuit breaker.

FIG. 3 depicts a cross-sectional side view of the circuit breaker 100 at the first trip mechanism 120, taken through the first plunger 134. As shown, a first guide 190 is slidingly supported on the first plunger 134 and configured to slide on the first plunger 134 between a first guide retracted position corresponding with the first lever 132 being in the first lever engaged position, and a first guide extended position corresponding with the first lever 132 being in the first lever disengaged position. In this manner, the first guide 190 drives the first lever 132 from the first lever engaged position to the first lever disengaged position when the first guide 190 slides from the first guide retracted position to the first guide extended position, and such that the first guide 190 drives the first lever 132 from the first lever disengaged position to the first lever engaged position when the first guide 190 slides from the first guide extended position to the first guide retracted position. The first guide 190 is engaged with the first lever 132 such that the first lever 132 is disposed through a first guide aperture 192 defined the first guide 190. An inner perimeter of the first guide aperture 192 is configured to abut the first lever 132 when the first guide 190 is driven between the first guide extended position and the first guide retracted position, and in this manner the first guide 190 is configured to drive the first lever 132 between the first lever engaged position and the first lever disengaged position at the first guide aperture 192.

A first bimetallic strip 194 disposed in the housing 102 is configured for substantially bending at a middle portion 200 along a length of the first bimetallic strip 194 located between a first bimetallic strip top end 202 fixed with respect to the housing 102 and a first bimetallic strip bottom end 204 fixed with respect to the housing 102 when the first phase electrical current through the circuit breaker 100 at the first trip mechanism 120 between the first set of electrical contacts 142 and the second set of electrical contacts 144 exceeds a predetermined value. The first guide 190 is engaged with the middle portion 200 of the first bimetallic strip 194 such that the first guide 190 is driven to the first guide extended position when the first bimetallic strip 194 substantially bends, thereby causing the first lever 132 to pivot about the first pin 130 to the first lever disengaged position.

A guide spring 210 is fixed with respect to the housing 102 and configured for exerting a spring bias on the first lever 132 directed to the first lever engaged position. More specifically, the guide spring 210 is configured for exerting a spring bias on the first guide 190 toward the first guide retracted position such that the first guide abuts the first lever 132 and transmits the spring bias from the guide spring 210 onto the first lever 132, toward the first lever engaged position. In the depicted embodiment, the guide spring 210 is a leaf spring extended along the inner surface 140 of the housing 102 and to the first bimetallic strip 194, however, alternative spring mechanisms can be employed as the guide spring 210 without departing from the scope of the present disclosure.

A first latch 212 is positioned on the first plunger 134, and a hook 214 complementary to the first latch 212 is disposed on a distal end 220 of the first lever 132, the distal end 220 of the first lever 132 being located closer to the first latch 212 as compared to the first pin 130. The hook 214 is configured for engagement with the first latch 212 by catching the first latch 212 when the first lever 132 is in the first lever engaged position, and the hook 214 is configured for disengagement with the latch by being spaced from the first latch 212 when the first lever 132 is in the first lever disengaged position. When the first plunger 134 is in the first plunger retracted position and the first lever 132 is in the first lever engaged position, the hook 214 catches the first latch 212 such that the first latch 212 abuts the hook 214, and in this manner the first lever 132 retains the first plunger 134 in the first plunger retracted position. When the first lever 132 is in the first lever disengaged position with respect to the first latch 212, the hook 214 disengages the first latch 212 such that the first lever 132 allows the first plunger 134 to be in the first plunger extended position.

Figure 4:
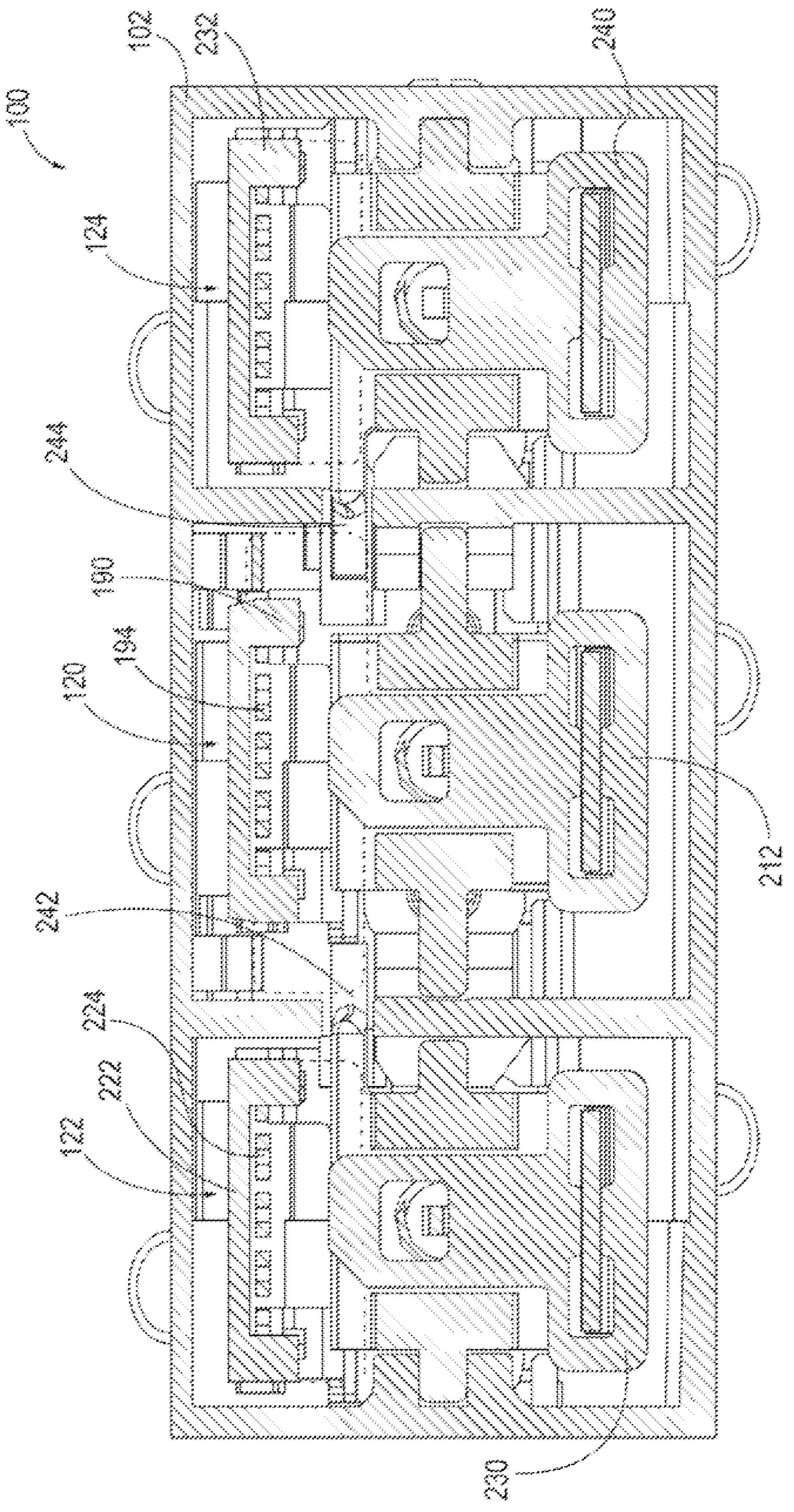
FIG. 4 is a cross-sectional top view of the circuit breaker.

FIG. 4 depicts a cross-sectional top view of the circuit breaker 100 including the first trip mechanism 120, the second trip mechanism 122, and the third trip mechanism 124. As shown, the second trip mechanism 122 includes a second guide 222, a second bimetallic strip 224, and a second latch 230, and the third trip mechanism 124 includes a third guide 232, a third bimetallic strip 234, and a third latch 240. Unless otherwise stated, the second guide 222, the second bimetallic strip 224, the second latch 230, the third guide 232, the third bimetallic strip 234, and the third latch 240 respectively function in a similar manner and have similar features as the first lever 132, the first guide 190, the first bimetallic strip 194, and the first latch 212.

The second trip mechanism 122 includes a first trip arm 242 integrally formed from the second plunger 162, and extended from the second plunger 162 such that the first trip arm 242 is spaced from the first trip mechanism 120 when the second plunger 162 is in the second plunger retracted position, and such that the first trip arm 242 contacts the first guide 190 and drives the first guide 190 to the first guide extended position, thereby driving the first lever 132 into the first lever disengaged position when the second plunger 162 is driven toward the second plunger extended position. In this manner, when the second plunger 162 is driven toward the second plunger extended position, the first trip arm 242 drives the first lever 132 into the first lever disengaged position by driving the first guide 190 toward the first guide extended position from the first guide retracted position.

The third trip mechanism 124 includes a second trip arm 244 integrally formed from the third plunger 176 having a similar construction as the first trip arm 242. To this end, the second trip arm 244 is extended from the second plunger 162 such that the second trip arm 244 is spaced from the first trip mechanism 120 when the third plunger 176 is in the third plunger retracted position, and such that the second trip arm 244 contacts the first guide 190 and drives the first lever 132 into the first lever disengaged position when the third plunger 176 when the third plunger 176 is driven to the third plunger extended position. In this manner, when the third plunger 176 is driven toward the third plunger extended position, the second trip arm 244 drives the first lever 132 into the first lever disengaged position by driving the first guide 190 toward the first guide extended position from the first guide retracted position. Unless otherwise stated, the first trip arm 242 functions in a similar manner and has similar features as the second trip arm 244.

The second trip mechanism 122 and the third trip mechanism 124 are disposed at opposite sides of the first trip mechanism 120. With this construction, the first trip arm 242 and the second trip arm 244 respectively extend toward opposite sides of the first guide 190 and are configured for engaging opposite sides of the first guide 190. Also, as shown in FIG. 2, the second pin 154 and the third pin 172 extend from opposite sides of the first plunger 134 such that the first plunger 134 is interposed between and separates the second pin 154 and the third pin 172 along a longitudinal direction of at least one of the first pin 130, the second pin 154, and the third pin 172. As such, static forces exerted on the first trip mechanism 120 by the second trip mechanism 122 and the third trip mechanism 124 are balanced across the first trip mechanism 120. For example, the spring bias exerted on the second plunger 162 by the second plunger spring 164 is transmitted to the first plunger 134 through the second pin 154, and is balanced across the first plunger 134 by the spring bias exerted on the third plunger 176 by the third plunger spring 180, which is transmitted to the first plunger 134 through the third pin 172.

Figure 5:
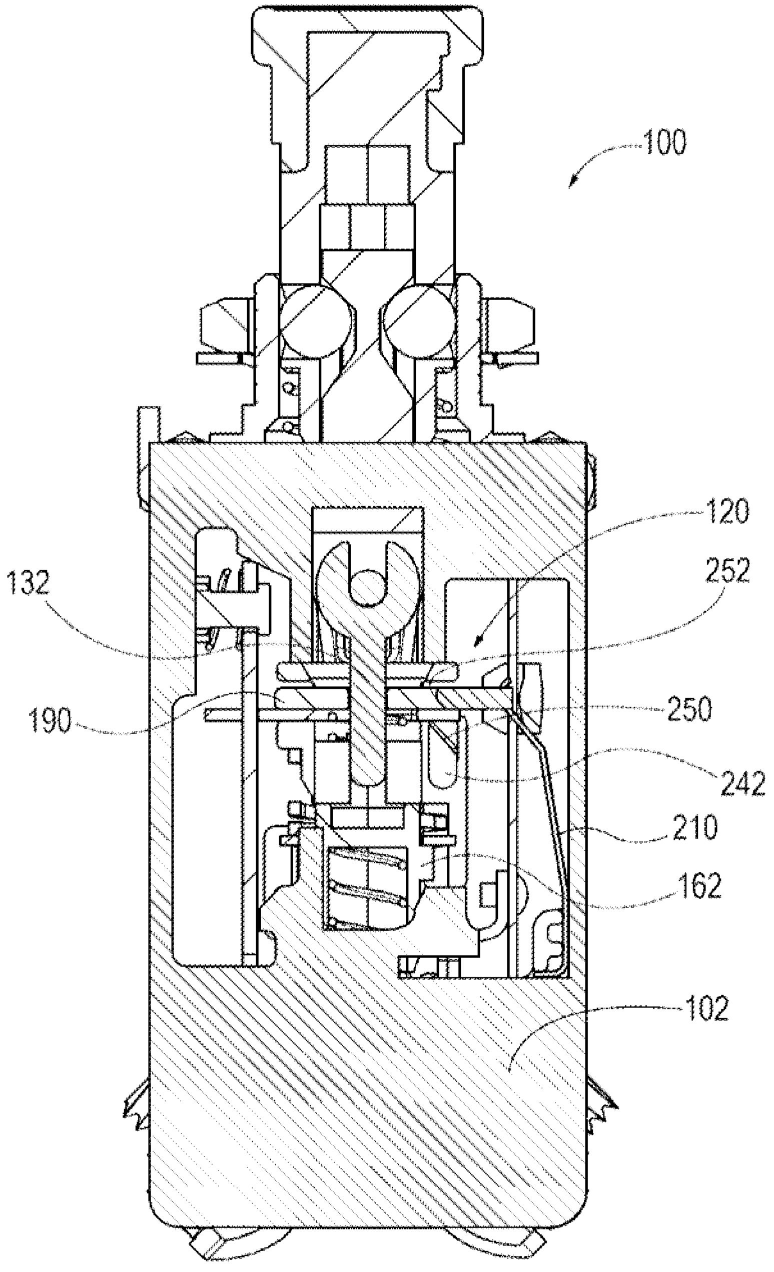
FIG. 5 is another cross-sectional side view of the circuit breaker.

FIG. 5 depicts a cross-sectional side view of the first trip mechanism 120 including the first lever 132, the first guide 190, and the first trip arm 242. The first trip arm 242 is configured to drive the first lever 132 into the first lever disengaged position by driving the first guide 190 toward the first guide extended position from the first guide retracted position, To this end, the first trip arm 242 includes a driving trip arm face 250 complementary to a driven first guide face 252 of the first guide 190. The driving trip arm face 250 is configured for contacting and sliding against the driven first guide face 252 of the first guide 190 to drive the first guide 190 toward the first guide extended position. The driving trip arm face 250 and the driven first guide face 252 are inclined toward the first guide extended position with respect to a direction of travel of the first trip arm 242 corresponding with the second plunger 162 traveling from the second plunger retracted position to the second plunger extended position.

The spring bias exerted on the second plunger 162 by the second plunger spring 164, transmitted to the first guide 190 through the first trip arm 242, is greater than the spring bias exerted on the first guide 190 by the guide spring 210 when the second lever 160 allows the second plunger 162 in the second plunger extended position. As such, when the second lever 160 allows the second plunger 162 in the second plunger extended position, the spring bias of the second plunger 162 exerted on the first guide 190 through the first trip arm 242 overcomes the spring bias of the guide spring 210 exerted on the first guide 190 to drive the first guide 190 to the first guide extended position, and drive the first lever 132 to the first lever disengaged position, thereby allowing the first plunger 134 to be in the first plunger extended position.

It will be appreciated that variations of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A circuit breaker comprising:
- a housing;
- a first trip mechanism disposed in the housing, the first trip mechanism including a first plunger disposed within the housing and selectively spring biased to a first plunger extended position from a first plunger retracted position; and
- a second trip mechanism disposed in the housing, the second trip mechanism including:
  - a second pin in physical contact with the first plunger and configured to be driven by the first plunger to a second pin extended position that follows the first plunger extended position, and to a second pin retracted position that follows the first plunger retracted position;
  - a second lever pivotally fixed with respect to the second pin and configured to be driven by the second pin to a second lever extended position that follows the second pin extended position, and to a second lever retracted position that follows the second pin retracted position;
  - a second plunger disposed within the housing and selectively spring biased to a second plunger extended position;
  - a third set of electrical contacts fixed with respect to the second plunger; and
  - a fourth set of electrical contacts fixed with respect to the housing,
  - wherein the second plunger defines a second plunger retracted position in which the third set of electrical contacts directly contact the fourth set of electrical contacts so as to make electrical contact, and the second plunger defines the second plunger extended position in which the third set of electrical contacts and the fourth set of electrical contacts are spaced from one another so as to create an open circuit; and
- wherein when the second pin is driven to the second pin extended position by the first plunger, the second lever follows the second pin to the second lever extended position to allow the second plunger to be in the second plunger extended position, thereby causing the third set of electrical contacts to be spaced from the fourth set of electrical contacts.

2. The circuit breaker according to claim 1, wherein the first trip mechanism further includes:
- a first pin fixed with respect to the housing; and
- a first lever pivotally fixed with respect to the first pin,
- wherein the first lever defines a first lever engaged position in which the first lever abuts the first plunger and retains the first plunger in the first plunger retracted position, and the first lever defines a first lever disengaged position in which the first lever allows the first plunger to be in the first plunger extended position.

3. The circuit breaker according to claim 2, further comprising a switch mounted on the housing with a switch external portion located external to the housing and a switch internal portion located internal to the housing and fixed with respect to the first pin such that the switch is configured to be actuated by a user at the switch external portion from a switch extended position to a switch retracted position with respect to the housing,
- wherein the first pin defines a first pin extended position that follows the switch extended position and corresponds with the first plunger extended position, and the first pin defines a first pin retracted position that follows the switch retracted position and corresponds with the first plunger retracted position such that actuating the switch from the switch extended position toward the switch retracted position drives the first pin from the first pin extended position toward the first pin retracted position and drives the first plunger from the first plunger extended position toward the first plunger retracted position.

4. The circuit breaker according to claim 2, further comprising a trip arm extended from the second plunger such that the trip arm is spaced from the first trip mechanism when the second plunger is in the second plunger retracted position, and such that the trip arm drives the first lever into the first lever disengaged position when the second plunger is driven toward the second plunger extended position.

5. The circuit breaker of claim 4, further comprising a guide slidingly supported on the first plunger and engaged with the first lever, the guide being configured to slide on the first plunger between a guide retracted position corresponding with the first lever being in the first lever engaged position, and a guide extended position corresponding with the first lever being in the first lever disengaged position such that the guide drives the first lever from the first lever engaged position to tile first lever disengaged position when the guide slides from the guide retracted position to the guide extended position, and such that the guide drives the first lever from the first lever disengaged position to the first lever engaged position when the guide slides from the guide extended position to the guide retracted position, wherein the trip arm drives the first lever into the first lever disengaged position by driving the guide toward the guide extended position from the guide retracted position.

6. The circuit breaker according to claim 5, further comprising a guide spring fixed with respect to the housing and configured for exerting a spring bias on the guide toward the guide retracted position such that the guide abuts the first lever and transmits the spring bias from the guide spring onto the first lever, toward the first lever engaged position, wherein the spring bias of the second plunger exerted on the guide through the trip arm is greater than the spring bias of the guide spring exerted on the guide when the second lever allows the second plunger in the second plunger extended position.

7. The circuit breaker according to claim 5, wherein the trip arm includes a driving face configured for contacting the guide and sliding against the guide to drive the guide toward the guide extended position, the driving face being inclined toward the guide extended position with respect to a direction of travel of the trip arm corresponding with the second plunger traveling from the second plunger retracted position to the second plunger extended position.

8. The circuit breaker according to claim 2, wherein the first trip mechanism further includes:

a first set of electrical contacts fixed with respect to the first plunger; and a second set of electrical contacts fixed with respect to the housing, wherein the first plunger defines the first plunger retracted position in which the first set of electrical contacts directly contact the second set of electrical contacts so as to make electrical contact, and the first plunger defines the first plunger extended position in which the first set of electrical contacts and the second set of electrical contacts are spaced from one another so as to create an open circuit.

9. The circuit breaker according to claim 8, further comprising:

a guide slidingly supported on the first plunger and engaged with the first lever, the guide being configured to slide on the first plunger between a guide retracted position corresponding with the first lever being in the first lever engaged position and a guide extended position corresponding with the first lever being in the first lever disengaged position such that the guide drives the first lever from the first lever engaged position to the first lever disengaged position when the guide slides from the guide retracted position to the guide extended position; and a bimetallic strip disposed in the housing and configured for substantially bending when an electrical current between the first set of electrical contacts and the second set of electrical contacts exceeds a predetermined value, wherein the guide is engaged with the bimetallic strip such that when the bimetallic strip substantially bends, the guide slides along the first plunger toward the guide extended position, and pivots the first lever about the first pin toward the first lever disengaged position.

10. The circuit breaker according to claim 9, further comprising a trip arm extended from the second plunger such that the trip arm is spaced from the first trip mechanism when the second plunger is in the retracted position, and the trip arm drives the first lever into the first lever disengaged position by driving the guide toward the guide extended position from the guide retracted position when the second plunger is driven toward the second plunger extended position.

11. The circuit breaker according to claim 8, further comprising a third trip mechanism disposed in the housing, the third trip mechanism including:

a third pin in physical contact with the first plunger and configured to be driven by the first plunger to a third pin extended position that follows the first plunger extended position, and to a third pin retracted position that follows the first plunger retracted position;

a third lever pivotally fixed with respect to the third pin and configured to be driven by the third pin to a third lever extended position that follows the third pin extended position, and to a third lever retracted position that follows the third pin retracted position;

a third plunger disposed within the housing and selectively spring biased to a third plunger extended position;

a fifth set of electrical contacts fixed with respect to the third plunger; and a sixth set of electrical contacts fixed with respect to the housing;

wherein the third plunger defines a third plunger retracted position in which the fifth set of electrical contacts directly contact the sixth set of electrical contacts so as to make electrical contact, and the third plunger defines the third plunger extended position in which the fifth set of electrical contacts and the sixth set of electrical contacts are spaced from one another so as to create an open circuit; and wherein the third lever defines a third lever engaged position in which the third lever retains the third plunger in the third plunger retracted position, and the third lever defines a third lever disengaged position in which the third lever permits the third plunger to be in the third plunger extended position, wherein when the third pin is driven to the third pin extended position by the first plunger, the third lever follows the third pin to the third lever extended position to allow the third plunger to be in the third plunger extended position, thereby causing the fifth set of electrical contacts to be spaced from the sixth set of electrical contacts.

12. The circuit breaker according to claim 11, further comprising a trip arm extended from the third plunger, such that the trip arm is spaced from the first trip mechanism when the third plunger is in the third plunger retracted position, and the trip arm drives the first lever into the first lever disengaged position when the third plunger is driven toward the third plunger extended position.

13. The circuit breaker according to claim 11, wherein the second pin and the third pin extend from opposite sides of the first plunger such that the first plunger is interposed between and separates the second pin and the third pin along a longitudinal direction of at least one of the second pin and the third pin.

14. A circuit breaker, comprising:

a housing, a first trip mechanism disposed in the housing, the first trip mechanism including:

a first plunger disposed within the housing and selectively spring biased to a first plunger extended position from a first plunger retracted position;

a first pin fixed with respect to the housing; and a first lever pivotally fixed with respect to the first pin, wherein the first lever defines a first lever engaged position in which the first lever abuts the first plunger and retains the first plunger in the first plunger retracted position, and the first lever defines a first lever disengaged position in which the first lever allows the first plunger to be in the first plunger extended position, and a second trip mechanism disposed in the housing, the second trip mechanism including:

a second plunger disposed within the housing and selectively spring biased to a second plunger extended position from a second plunger retracted position;

a second pin in physical contact with the first plunger; and a trip arm extended from the second plunger such that the trip arm is spaced from the first trip mechanism when the second plunger is in the second plunger retracted position, and such that the trip arm drives the first lever into the first lever disengaged position when the second plunger is driven toward the second plunger extended position.

15. The circuit breaker according to claim 14, wherein the second trip mechanism further includes a second lever pivotally fixed with respect to the second pin supported in the housing, the second lever defines a second lever engaged position in which the second lever retains the second plunger in the second plunger retracted position, and the second lever defines a second lever disengaged position in which the second lever permits the second plunger to be in the second plunger extended position.

16. The circuit breaker according to claim 15, further comprising a guide slidingly supported on the first plunger and engaged with the first lever, the guide being configured to slide on the first plunger between a guide retracted position corresponding with the first lever being in the first lever engaged position and a guide extended position corresponding with the first lever being in the first lever disengaged position such that the guide drives the first lever from the first lever engaged position to the first lever disengaged position when the guide slides from the guide retracted position to the guide extended position, and such that the guide drives the first lever from the first lever disengaged position to the first lever engaged position when the guide slides from the guide extended position to the guide retracted position, wherein the trip arm drives the first lever into the first lever disengaged position by driving the guide toward the guide extended position when the second plunger is driven toward the second plunger extended position.

17. The circuit breaker according to claim 16, further comprising a guide spring fixed with respect to the housing and configured for exerting a spring bias on the guide directed to the guide retracted position such that the guide abuts the first lever and transmits the spring bias from the guide spring onto the first lever, toward the first lever engaged position, wherein the spring bias of the second plunger exerted on the guide through the trip arm is greater than the spring bias of the guide spring exerted on the guide when the second lever allows the second plunger in the second plunger extended position.

18. The circuit breaker according to claim 14, further comprising:

a first set of electrical contacts fixed with respect to the first plunger;

a second set of electrical contacts fixed with respect to the housing;

a third set of electrical contacts fixed with respect to the second plunger; and a fourth set of electrical contacts fixed with respect to the housing, wherein the first plunger defines the first plunger retracted position in which the first set of electrical contacts directly contact the second set of electrical contacts so as to make electrical contact, and the first plunger defines the first plunger extended position in which the first set of electrical contacts and the second set of electrical contacts are spaced from one another so as to create an open circuit, and wherein the second plunger defines the second plunger retracted position in which the third set of electrical contacts directly contact the fourth set of electrical contacts so as to make electrical contact, and the second plunger defines the second plunger extended position in which the third set of electrical contacts and the fourth set of electrical contacts are spaced from one another so as to create an open circuit.

19. The circuit breaker according to claim 14, further comprising:

a latch positioned on the first plunger; and a hook disposed on a distal end of the first lever, the distal end of the first lever being located closer to the latch as compared to the first pin, the hook being configured for engagement with the latch when the first lever is in the first lever engaged position, and configured for disengagement with the latch when the first lever is in the first lever disengaged position, wherein when the first plunger is in the first plunger retracted position and the first lever is in the first lever engaged position, the latch abuts the hook such that the first lever retains the first plunger in the first plunger retracted position, and wherein when the first lever is in the first lever disengaged position with respect to the latch, the hook disengages the latch such that the first lever allows the first plunger to be in the first plunger extended position.

20. The circuit breaker according to claim 14, further comprising a third trip mechanism disposed in the housing, the third trip mechanism including:

a third pin fixed with respect to the housing;

a third lever pivotally fixed with respect to the third pin;

a third plunger disposed within the housing and selectively spring biased to a third plunger extended position;

a fifth set of electrical contacts fixed with respect to the third plunger; and a sixth set of electrical contacts fixed with respect to the housing, wherein the third plunger defines a third plunger retracted position in which the fifth set of electrical contacts directly contact the sixth set of electrical contacts so as to make electrical contact, and the third plunger defines the third plunger extended position in which the fifth set of electrical contacts and the sixth set of electrical contacts are spaced from one another so as to create an open circuit; and wherein the third lever defines a third lever engaged position in which the third lever retains the third plunger in the third plunger retracted position, and the third lever defines a disengaged position in which the third lever permits the third plunger to be in the third plunger extended position.

* * * * *